(12) United States Patent  
Yagihashi et al.

(10) Patent No.: US 9,241,123 B2  
(45) Date of Patent: Jan. 19, 2016

(54) ELECTRONIC DEVICE

(75) Inventors: Ayumu Yagihashi, Kanagawa (JP); Kenichi Kitatani, Kanagawa (JP); Hiroyuki Aoki, Kanagawa (JP); Yumi Katou, Kanagawa (JP); Atsuhiko Murayama, Kanagawa (JP); Seiji Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 220 days.

(21) Appl. No.: 13/982,388

(22) PCT Filed: Feb. 1, 2012

(86) PCT No.: PCT/JP2012/000684  
§ 371 (c)(1),  
(2), (4) Date: Jul. 29, 2013

(87) PCT Pub. No.: WO2012/105254  
PCT Pub. Date: Aug. 9, 2012

(65) Prior Publication Data  
US 2013/0314610 A1    Nov. 28, 2013

(30) Foreign Application Priority Data

Feb. 1, 2011    (JP) .................................. 2011-020032

(51) Int. Cl.  
*H04N 5/60* (2006.01)  
*H04R 3/12* (2006.01)  
*H04N 21/422* (2011.01)  
(Continued)

(52) U.S. Cl.  
CPC .......... *H04N 5/60* (2013.01); *H04N 21/42201* (2013.01); *H04N 21/439* (2013.01); *H04N 21/4316* (2013.01); *H04N 21/44218* (2013.01); *H04R 3/12* (2013.01); *H04R 1/403* (2013.01); *H04R 17/00* (2013.01); *H04R 2217/03* (2013.01); *H04R 2430/20* (2013.01); *H04R 2499/15* (2013.01)

(58) Field of Classification Search  
None  
See application file for complete search history.

(56) References Cited

U.S. PATENT DOCUMENTS

2006/0262185 A1* 11/2006 Cha et al. .................... 348/51  
2011/0242298 A1* 10/2011 Bathiche et al. ............ 348/54  
2012/0120218 A1* 5/2012 Flaks et al. .................. 348/77

FOREIGN PATENT DOCUMENTS

CN    101169897 A    4/2008  
JP    06-236152 A    8/1994  
(Continued)

OTHER PUBLICATIONS

English machine translation of JP2006-109241 (Fujinawa, Nobuhiro; Voice Output Device, and Image Display Device; published Apr. 2006).*

(Continued)

*Primary Examiner* — Wayne Young  
*Assistant Examiner* — Mark Fischer  
(74) *Attorney, Agent, or Firm* — Sughrue Mion, PLLC (57) ABSTRACT

An electronic device includes: a plurality of oscillators (10) that output modulation waves of a parametric speaker; a display unit (40) that displays a plurality of contents at the same time; a recognition unit that recognizes the locations of a plurality of users; and a control unit that controls the oscillators (10) so as to reproduce sounds corresponding to the contents. The control unit controls the oscillators (10) so as to reproduce the sound corresponding to the content selected by each user, toward the location of each of the plurality of users which is recognized by the recognition unit.

4 Claims, 7 Drawing Sheets

(51) Int. Cl.
*H04N 21/431* (2011.01)
*H04N 21/439* (2011.01)
*H04N 21/442* (2011.01)
H04R 17/00 (2006.01)
H04R 1/40 (2006.01)

(56) References Cited

FOREIGN PATENT DOCUMENTS

| | | | |
|---|---|---|---|
| JP | 2000-124723 A | 4/2000 | |
| JP | 2003-032573 A | 1/2003 | |
| JP | 2004112212 A * | 4/2004 | ............... H04R 1/32 |
| JP | 2006-067386 A | 3/2006 | |
| JP | 2006-109241 A | 4/2006 | |
| JP | 2006-157558 A | 6/2006 | |
| JP | 2007-028134 A | 2/2007 | |
| JP | 2008-072541 A | 3/2008 | |
| JP | 2010-41167 A | 2/2010 | |
| JP | 2010-114775 A | 5/2010 | |
| WO | 2006/005938 A1 | 1/2006 | |

OTHER PUBLICATIONS

English machine translation of JP2004-112212 (Yoshida et al.; Super-Directivity Speaker; published Apr. 2004).*
International Search Report for PCT/JP2012/000684, dated Apr. 3, 2012.
Communication dated May 6, 2015 from the State Intellectual Property Office of the P.R.C. in counterpart application No. 201280007394.2.
Extended European Search Report dated Mar. 5, 2015, issued by the European Patent Office in counterpart European application No. 12741748.3.

* cited by examiner

ELECTRONIC DEVICE

CROSS REFERENCE TO RELATED APPLICATIONS

This application is a National Stage of International Application No. PCT/JP2012/000684 filed Feb. 1,2012, claiming priority based on Japanese Patent Application No. 2011-020032 filed Feb. 1,2011, the contents of all of which are incorporated herein by reference in their entirety.

TECHNICAL FIELD

The present invention relates to an electronic device using ultrasonic waves.

BACKGROUND ART

Various studies on a technique regarding an electronic device such as a portable terminal device have been conducted. For example, Patent Document 1 discloses a technique in which a distance between an antenna mounted in a portable communication device and a head is measured using ultrasonic waves and matching conditions of a matching circuit of the communication device are changed on the basis of the distance. In addition, Patent Documents 2 to 4 disclose a technique regarding a speaker of a portable terminal device.

Patent Document 2 discloses a technique in which a distance from an object imaged by an imaging unit is measured and a sound is constantly located in a predetermined space depending on the distance. In addition, Patent Document 3 discloses a technique in which a distance between an auditor and a speaker is measured and the distance is reflected in a coefficient of a filter using a head-related transfer function (HRTF) modeled as a database. Further, Patent Document 4 discloses a technique regarding a portable terminal device including a plurality of superdirective speakers that output sound signals.

RELATED DOCUMENT

Patent Document

[Patent Document 1] Japanese Unexamined Patent Publication No. 2000-124723
[Patent Document 2] Japanese Unexamined Patent Publication No. 2006-157558
[Patent Document 3] Japanese Unexamined Patent Publication No. 2007-28134
[Patent Document 4] Japanese Unexamined Patent Publication No. 2006-67386

DISCLOSURE OF THE INVENTION

In an electronic device that displays a plurality of contents at the same time, when a plurality of sounds corresponding to each content are reproduced, these sounds are mixed together. For this reason, when a plurality of users view different contents, it is difficult for the user to recognize the sound corresponding to the content that he or she is viewing. Accordingly, in an electronic device that displays a plurality of contents at the same time, when a plurality of users view different contents, it is required for a sound corresponding to the content selected by each user to be capable of being reproduced with respect to the user.

An object of the present invention is to provide an electronic device that displays a plurality of contents at the same time, wherein a sound corresponding to the content selected by each user is reproduced with respect to the user.

According to the invention, there is provided an electronic device including: a plurality of oscillators that output modulation waves of a parametric speaker; a display unit that displays a plurality of contents at the same time; a recognition unit that recognizes the positions of a plurality of users; and a control unit that controls the oscillators so as to reproduce sounds corresponding to the contents, wherein the control unit controls the oscillators so as to reproduce the sound corresponding to the content selected by each user, toward the location of each of the plurality of users which is recognized by the recognition unit.

According to the invention, in the electronic device that displays a plurality of contents at the same time, the sound corresponding to the content selected by each user can be reproduced with respect to the user.

BRIEF DESCRIPTION OF THE DRAWINGS

The above-described objects, other objects, features and advantages will be further apparent from the preferred embodiments described below, and the accompanying drawings as follows.

DESCRIPTION OF EMBODIMENTS

Hereinafter, embodiments of the invention will be described in detail with reference to the accompanying drawings. Meanwhile, throughout the drawings, like reference numerals refer to like elements, and the description thereof will not be repeated.

Figure 1:
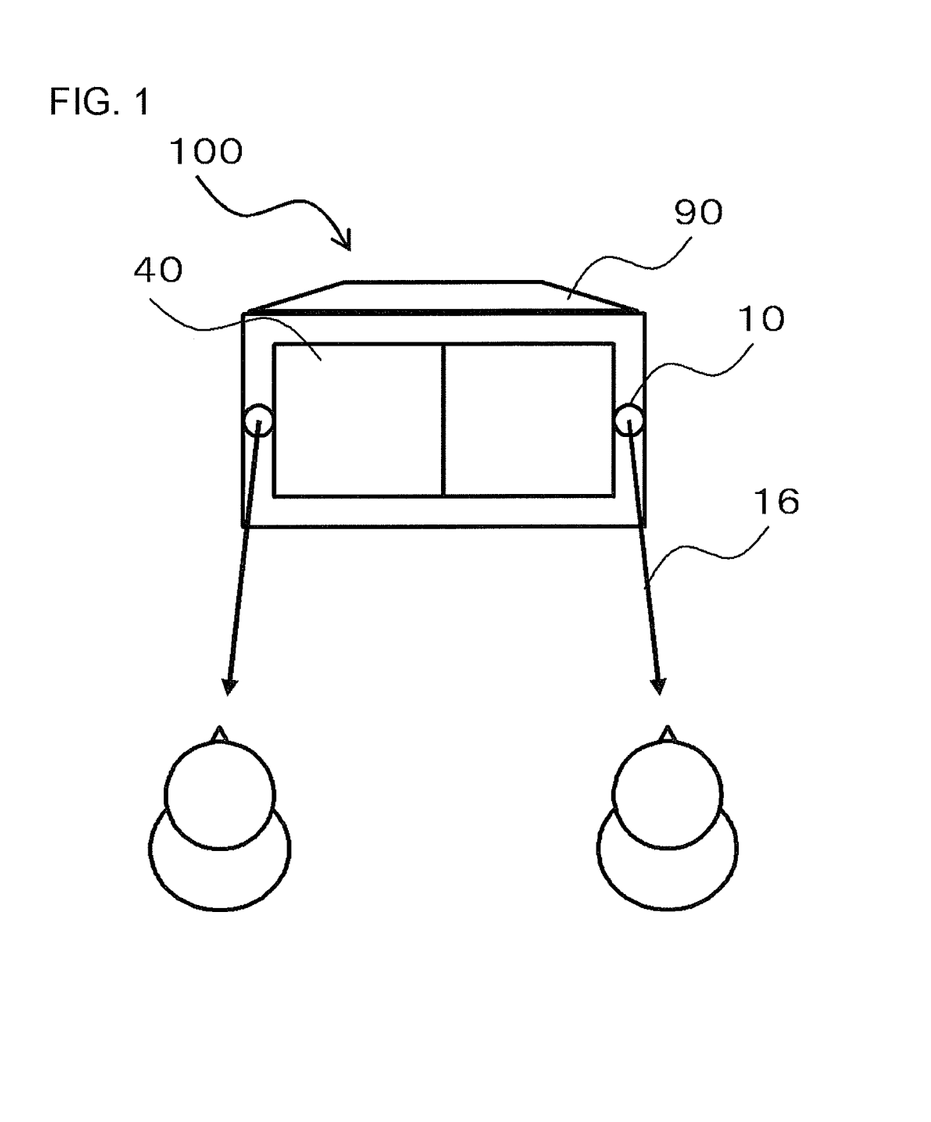
FIG. 1 is a schematic view illustrating a method of operating an electronic device according to a first embodiment.
Figure 2:
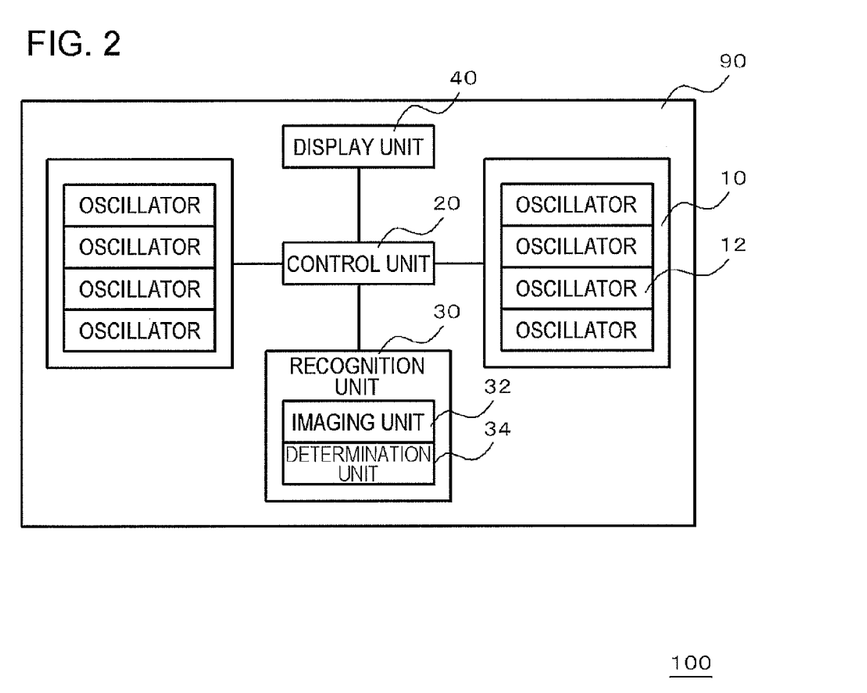
FIG. 2 is a block diagram illustrating the electronic device shown in FIG. 1.

FIG. 1 is a schematic view illustrating a method of operating an electronic device 100 according to a first embodiment. FIG. 2 is a block diagram illustrating the electronic device 100 shown in FIG. 1. The electronic device 100 includes a plurality of oscillators 10, a display unit 40, a recognition unit 30, and a control unit 20. The electronic device 100 is, for example, a television, a display device in a digital signage, a portable terminal device, or the like.

The oscillators 10 output ultrasonic waves 16. The ultrasonic waves 16 are modulation waves of a parametric speaker. The display unit 40 displays a plurality of contents at the same time. The recognition unit 30 recognizes the locations of a plurality of users. The control unit 20 controls the oscillators 10 so as to reproduce sounds corresponding to the contents. The control unit 20 controls the oscillators 10 so as to reproduce the sound corresponding to the content selected by each user, toward the location of each of the plurality of users which is recognized by the recognition unit 30. Hereinafter, a configuration of the electronic device 100 will be described in detail with reference to FIGS. 1 to 5.

As shown in FIG. 1, the electronic device 100 further includes, for example, a housing 90. As shown in FIG. 2, the oscillators 10, the control unit 20, the recognition unit 30, and the display unit 40 are disposed, for example, inside the housing 90.

The plurality of oscillators 10 are individually controlled, for example, by the control unit 20. In addition, as shown in FIG. 2, the oscillator 10 can be constituted by a plurality of oscillators 12. The plurality of oscillators 12 are individually controlled, for example, by the control unit 20.

As shown in FIG. 1, the display unit 40 displays two contents at the same time, for example, through two screens which are divided into right and left portions. However, the displaying of the plurality of contents using the display unit 40 can also be modified in various ways, for example, by a user's operation. Two contents can also be displayed at the same time, for example, through two screens which are divided into up and down portions, and four contents can also be displayed at the same time through four screens.

The recognition unit 30 includes an imaging unit 32 and a determination unit 34. The imaging unit 32 captures an image in a region including the plurality of users to generate image data. The determination unit 34 determines the location of each user by processing the image data. The determination of the location of each user is performed, for example, by individually storing a feature amount for identifying each user in advance, and by matching the feature amount and the image data. The feature amount can include, for example, the size of an interval between both eyes of the user, and the size and shape of a triangle connecting both eyes and a nose of the user. In addition, when the user moves in a region where the imaging unit 32 captures an image, the recognition unit 30 may have a function of determining the location of the user by automatically following the user.

The control unit 20 is connected to the oscillators 10, the recognition unit 30, and the display unit 40. The control unit 20 controls each oscillator 10 so as to reproduce the sound corresponding to the content selected by each user toward the location of each of the plurality of users, and this is performed, for example, as follows. First, the feature amount of each user is registered in association with an ID. Next, the content selected by each user is associated with the ID of each user. Subsequently, an ID corresponding to a specific content is selected, and the feature amount associated with the selected ID is read out. A user having the read out feature amount is selected by image processing, and the sound corresponding to the content is reproduced with respect to the user.

Figure 3:
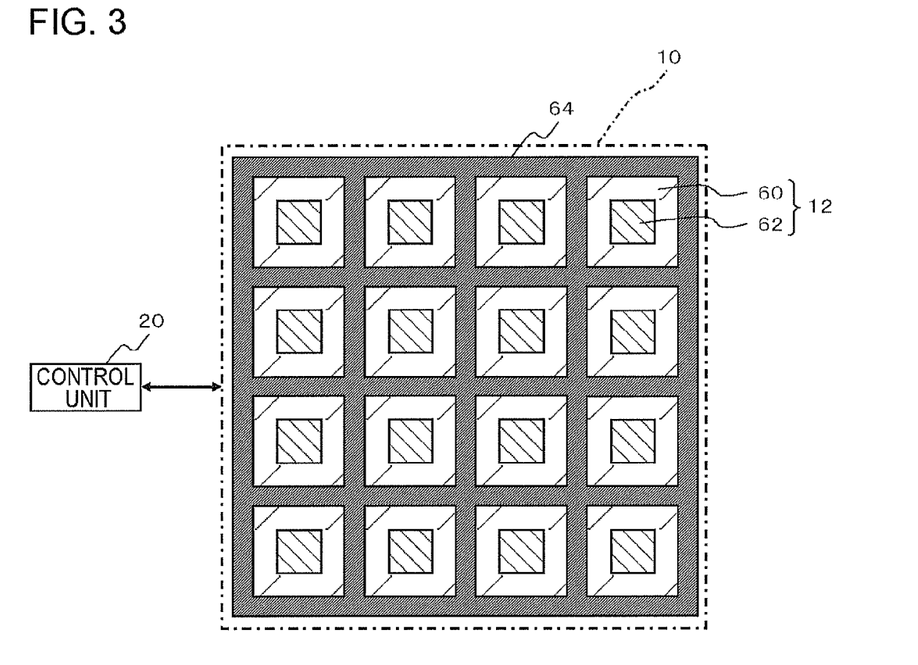
FIG. 3 is a plan view illustrating an oscillator shown in FIG. 2.

FIG. 3 is a plan view illustrating the oscillator 10 shown in FIG. 2. As shown in FIG. 3, the oscillator 10 is configured, for example, in such a manner that the plurality of oscillators 12 are arranged in an array.

Figure 4:
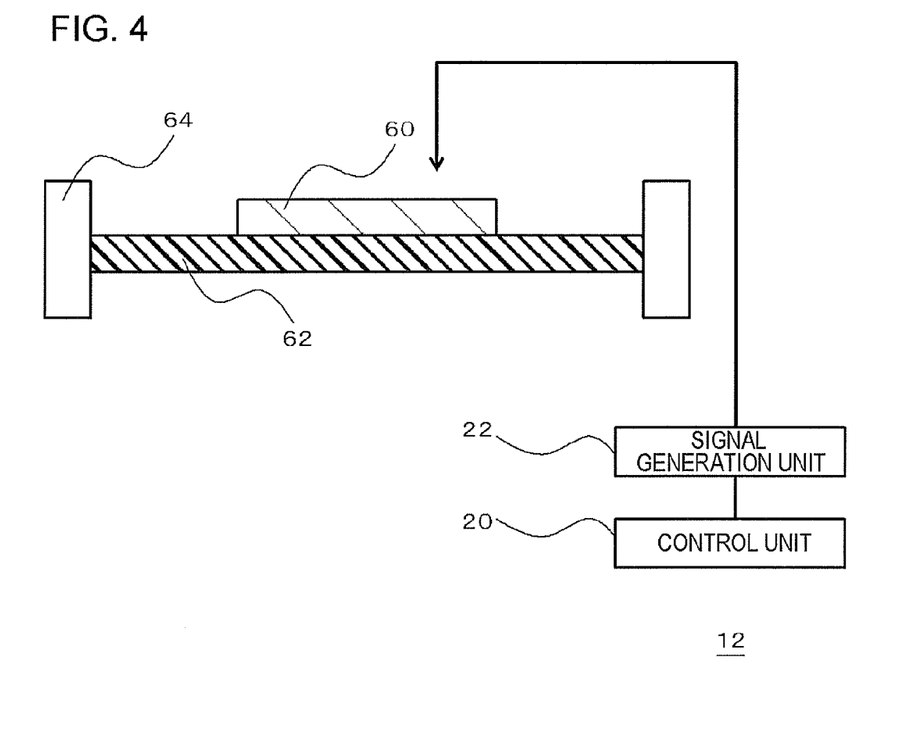
FIG. 4 is a cross-sectional view illustrating the oscillator shown in FIG. 3.

FIG. 4 is a cross-sectional view illustrating the oscillator 12 shown in FIG. 2. The oscillator 12 includes a piezoelectric vibrator 60, a vibration member 62, and a supporting member 64. The piezoelectric vibrator 60 is provided on one surface of the vibration member 62. The supporting member 64 supports an edge of the vibration member 62.

The control unit 20 is connected to the piezoelectric vibrator 60 via a signal reproduction unit 22. The signal reproduction unit 22 generates an electrical signal to be input to the piezoelectric vibrator 60. The control unit 20 controls the signal reproduction unit 22 on the basis of information that is input from the outside, thereby controlling the oscillation of the oscillator 12. The control unit 20 inputs a modulation signal as a parametric speaker via the signal reproduction unit 22. At this time, the piezoelectric vibrator 60 uses sound waves of equal to or greater than 20 kHz, for example, 100 kHz, as carrier waves of the signal.

Figure 5:
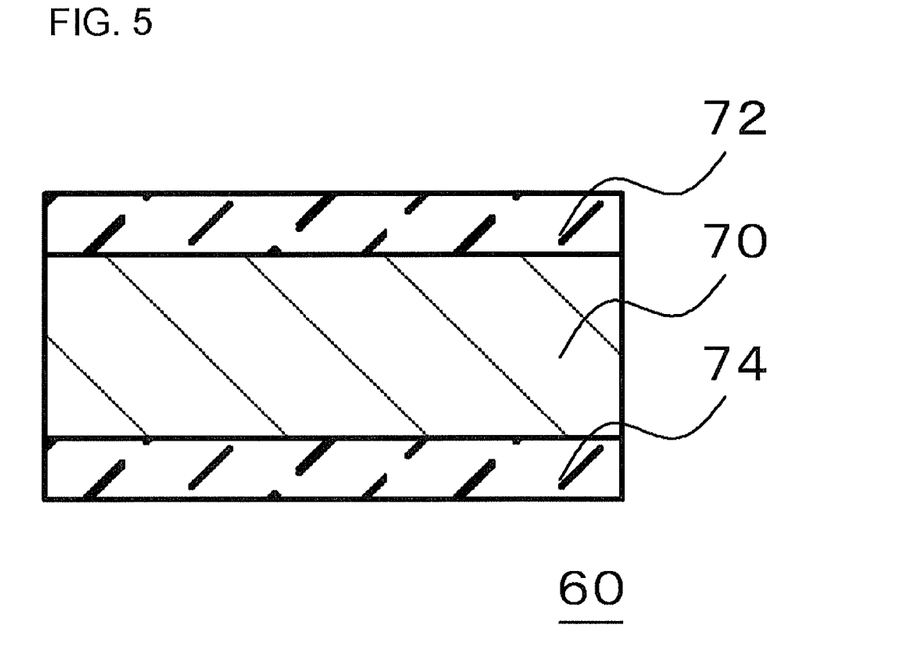
FIG. 5 is a cross-sectional view illustrating a piezoelectric vibrator shown in FIG. 4.

FIG. 5 is a cross-sectional view illustrating the piezoelectric vibrator 60 shown in FIG. 4. As shown in FIG. 4, the piezoelectric vibrator 60 includes a piezoelectric body 70, an upper electrode 72, and a lower electrode 74. In addition, the piezoelectric vibrator 60 has, for example, a circular shape or an oval shape. The piezoelectric body 70 is interposed between the upper electrode 72 and the lower electrode 74. In addition, the piezoelectric body 70 is polarized in a thickness direction thereof. The piezoelectric body 70 is formed of a material having a piezoelectric effect, for example, lead zirconate titanate (PZT) or barium titanate ($BaTiO_3$) as a material having a high electro-mechanical conversion efficiency. In addition, the thickness of the piezoelectric body 70 may be preferably 10 µm to 1 mm. When the thickness is less than 10 µm, the piezoelectric body 70 is formed of a brittle material, and thus the piezoelectric body 70 is easily damaged during the handling. On the other hand, when the thickness exceeds 1 mm, an electric field intensity of the piezoelectric body 70 decreases, thereby leading to a decrease in energy conversion efficiency.

The upper electrode 72 and the lower electrode 74 are formed of a material having electric conductivity, for example, silver or a silver/palladium alloy. Since silver is a low-resistance versatile material, there is an advantage from the viewpoint of a manufacturing cost and a manufacturing process. In addition, since a silver/palladium alloy is a low-resistance material having an excellent oxidation resistance, it has an excellent reliability. The thicknesses of the upper electrode 72 and the lower electrode 74 are preferably 1 µm to 50 µm. When the thicknesses are less than 1 µm, it is difficult to uniformly form the upper electrode 72 and the lower electrode 74. On the other hand, when the thicknesses exceed 50 µm, the upper electrode 72 or the lower electrode 74 serves as a constraint surface with respect to the piezoelectric body 70, thereby leading to a decrease in energy conversion efficiency.

The vibration member 62 is formed of a material, such as a metal and a resin, having a high elastic modulus with respect to ceramic which is a brittle material, and is formed of a versatile material, for example, phosphor bronze or stainless steel. The thickness of the vibration member 62 is preferably 5 µm to 500 µm. In addition, a longitudinal elastic modulus of the vibration member 62 is preferably 1 GPa to 500 GPa. When the longitudinal elastic modulus of the vibration member 62 is excessively low or high, there is a concern that characteristics and reliability as a mechanical vibrator may be damaged.

In the embodiment, sound reproduction is performed using an operation principle of a parametric speaker. The operation principle of the parametric speaker is as follows. The sound reproduction is performed according to the operation principle of the parametric speaker that emits ultrasonic waves on which an AM modulation, a DSB modulation, an SSB modulation, or a FM modulation is performed into the air, and issues an audible sound based on the non-linear characteristics when ultrasonic waves are propagated into the air. The term "non-linear" herein indicates a transition from a laminar flow to a turbulent flow when the Reynolds number expressed by the ratio of an inertial action and the viscous action of a flow increases. In other words, since the sound wave is very slightly disturbed within a fluid, the sound wave is propagated non-linearly. In particular, when the ultrasonic waves are emitted into the air, higher harmonic waves associated with the non-linearity are conspicuously generated. In addition, the sound wave is in a sparse and dense state in which molecular groups in the air are mixed in the light and shade. When it takes more time for air molecules to be restored rather than compressed, the air which is not capable of being restored after the compression collides with the continuously propagated air molecules, and thus a shock wave occurs, thereby generating an audible sound. Since the parametric speaker can form a sound field only around a user, there is an advantage from the viewpoint of privacy protection.

Figure 6:
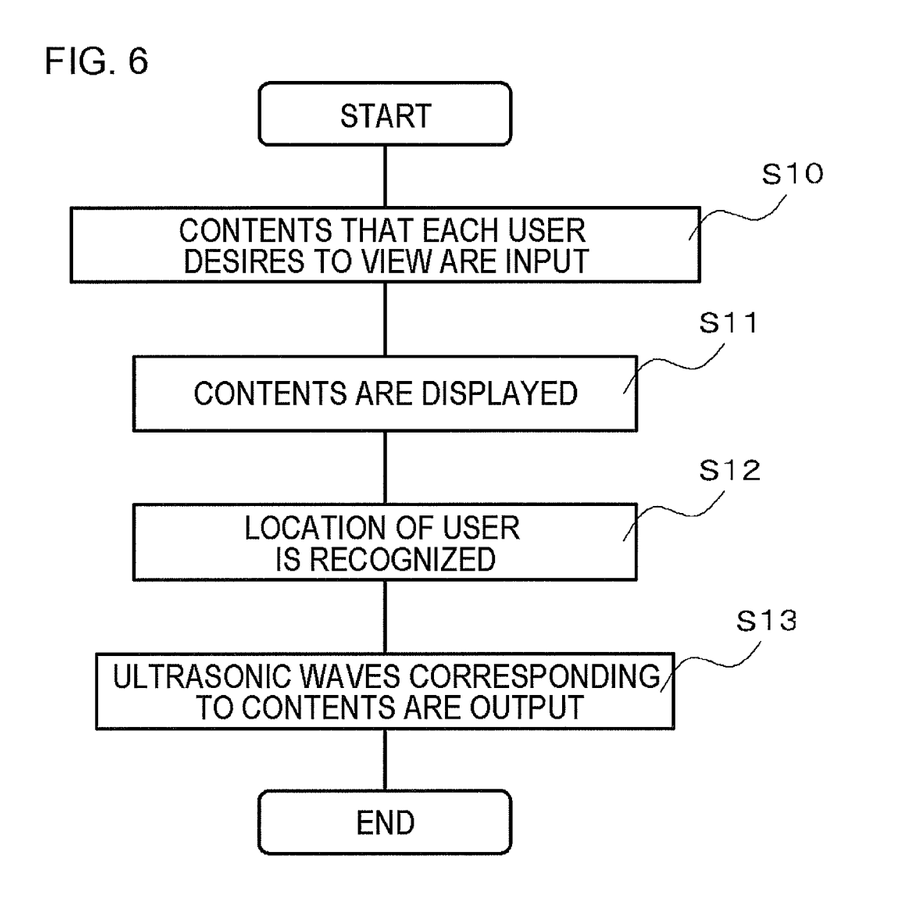
FIG. 6 is a flow chart illustrating a method of operating the electronic device shown in FIG. 1.

Hereinafter, a method of operating the electronic device 100 will be described. FIG. 6 is a flow chart illustrating a method of operating the electronic device 100 shown in FIG. 1. First, each user selects contents that he or she desires to view, and inputs the contents in the electronic device 100 (S10). Next, the display unit 40 displays a plurality of contents selected by each user (S11). At this time, the display unit 40 displays the plurality of contents at the same time.

Next, the recognition unit 30 recognizes the locations of a plurality of users (S12). The locations of the plurality of users are determined by the determination unit 34 which processes the image data generated by the imaging unit 32. The control unit 20 controls the oscillators 10 so as to reproduce the sound corresponding to the content selected by each user, toward the location of each of the plurality of users which is recognized by the recognition unit 30 (S13). In the meantime, when the recognition unit 30 follows and recognizes the location of the user, the control unit 20 may frequently control a direction in which the oscillator 10 reproduces the sound, on the basis of the location of the user which is recognized by the recognition unit 30.

Hereinafter, effects of the embodiment will be described. According to the electronic device 100 of the embodiment, sounds corresponding to contents are reproduced by the ultrasonic waves 16 that are output by the oscillators 10. The control unit 20 controls the oscillators 10 so as to reproduce the sound corresponding to the content selected by each user, toward the location of each of the plurality of users. Since the sounds corresponding to the contents are reproduced by ultrasonic waves having a high directionality, the plurality of sounds corresponding to the contents are not mixed together. Accordingly, in the electronic device that displays the plurality of contents at the same time, the sound corresponding to the content selected by each user can be reproduced with respect to the user.

Figure 7:
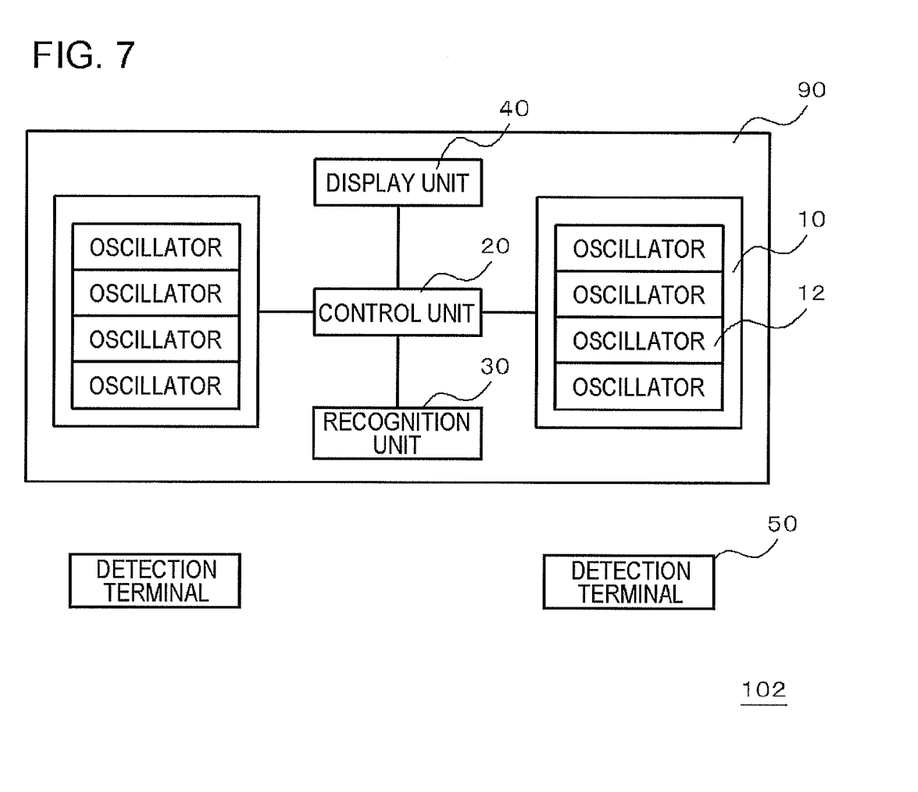
FIG. 7 is a block diagram illustrating an electronic device according to a second embodiment.

FIG. 7 is a block diagram illustrating an electronic device 102 according to a second embodiment and corresponds to FIG. 2 according to the first embodiment. The electronic device 102 according to the embodiment is the same as the electronic device 100 according to the first embodiment except that the electronic device 102 includes a plurality of detection terminals 50.

The plurality of detection terminals 50 are respectively held by a plurality of users. The recognition unit 30 recognizes the locations of the users by recognizing the locations of the detection terminals 50. The recognition of the locations of the detection terminals 50 using the recognition unit 30 is performed, for example, by causing the recognition unit 30 to receive electric waves emitted from the detection terminals 50. In addition, when the user holding the detection terminal 50 moves, the recognition unit 30 may have a function of determining the location of the user by automatically following the user. The detection terminal 50 may have, for example, a function of selecting contents and a function of adjusting a volume of a sound reproduced by the ultrasonic waves 16.

In addition, the recognition unit 30 may include the imaging unit 32 and the determination unit 34. The imaging unit 32 generates image data obtained by capturing an image in a region including the user, and the determination unit 34 processes the image data, thereby allowing the detailed location of the ear or the like of the user to be specified. For this reason, the location of the user can be further precisely recognized in conjunction with the location detection using the detection terminals 50.

Even in the embodiment, the control unit 20 controls each oscillator 10 so as to reproduce the sound corresponding to the content selected by each user toward the location of each of the plurality of users, and this is performed, for example, as follows. First, an ID of each detection terminal 50 is registered in advance. Next, the content selected by each user is associated with the ID of the detection terminal 50 held by each user. Subsequently, the ID indicating each detection terminal 50 is transmitted from the detection terminal 50. The recognition unit 30 recognizes the location of the detection terminal 50 on the basis of a direction in which the ID is transmitted. Then, the sound corresponding to a specific content is reproduced to the user holding the detection terminal 50 having an ID corresponding to the content.

In addition, when each user operates his or her own detection terminal 50 to select the content, the sound corresponding to the content may be reproduced toward the user having the detection terminal 50.

Even in the embodiment, the same effects as the first embodiment can be obtained.

As described above, although the embodiments of the invention have been set forth with reference to the drawings, these are merely illustrative of the invention, and various configurations other than those stated above can be adopted.

The application is based on Japanese Patent Application No. 2011-020032 filed on Feb. 1, 2011, the content of which is incorporated herein by reference.

The invention claimed is:

1. An electronic device comprising:
    a plurality of oscillators that output modulation waves of a parametric speaker;
    a display unit that displays a plurality of contents at the same time;
    a recognition unit that recognizes a location of each of a plurality of users; and
    a control unit that controls the plurality of oscillators so as to reproduce sounds corresponding to the plurality of contents,
    wherein the control unit controls the plurality of oscillators so as to reproduce the sound corresponding to the content selected by each user, toward the location of each of the plurality of users which is recognized by the recognition unit, and
    wherein the recognition unit comprises:
        an imaging unit that generates image data by capturing an image in a region that includes each user; and
        a determination unit that determines a location of an ear of each user by processing the image data.

2. The electronic device according to claim 1, further comprising:
    a plurality of detection terminals that are respectively held by the plurality of users,
    wherein the recognition unit recognizes the location of each user by recognizing a location of each detection terminal.

3. The electronic device according to claim 1,
    wherein the recognition unit follows and recognizes the location of each user, and
    wherein the control unit controls a direction in which the oscillator reproduces the sound, on the basis of the location of each user which is recognized by the recognition unit.

4. The electronic device according to claim 1,
wherein the electronic device is a portable terminal device.

\* \* \* \* \*